Patented Apr. 23, 1929.

1,710,159

UNITED STATES PATENT OFFICE.

CHARLES FISCHER, JR., OF WYOMING, AND WARREN T. REDDISH, OF CINCINNATI, OHIO, ASSIGNORS TO THE KONTOL COMPANY, OF DALLAS, TEXAS, A CORPORATION OF TEXAS.

PROCESS OF TREATING EMULSIONS.

No Drawing. Application filed September 2, 1926. Serial No. 133,299.

Our invention relates to a treatment of the oil and water emulsions undesirably incidental to petroleum production.

The object of this treatment is to remove the characteristic of permanence from the emulsions and/or to accelerate the coalescence of the components.

We treat these emulsions with a specific class of reagents so pertinently potent that they induce the desired result when introduced into the emulsion in relatively small quantities.

This class of reagents comprises mixtures of sludge layer mineral oil-sodium sulphonates and sodium aluminate. A preferred reagent and process of producing the same are described and claimed in our co-pending application, Serial No. 133,300. According to this application the preferred process of producing this reagent is to treat sludge layer aluminum sulphonate such as described and claimed in Divine Patent No. 1,438,101 and Divine Patent No. 1,495,891 with aqueous sodium hydroxide to a phenol phthalein end point. The resulting product is sodium sulphonate plus sodium aluminate.

The reagent of the nature described is incorporated in the emulsions in the proportion of one part reagent to one thousand parts emulsion by volume. The emulsion is then heated to and maintained at a temperature between 150° and 200° F. until coalescence has proceeded to an extent sufficient to permit stratification into an oil layer and a water layer. This separation can be produced by gravity settling, filtration, centrifugal force or other mechanical means.

Emulsion characteristics vary infinitely according to proportions of oil and water, percentage and specie of salt in water solution, and presence or nature of emulsifying agent. No adequate comprehensive emulsion classifications have been made or can be made as a result of research to date. But we have verified the utility of the herein disclosed treatment of emulsions generally and have noted the particular effectiveness of our reagent on emulsions relatively insensitive to other known reagents.

Having described our invention, we claim:

1. In the process of separating the oil and water of emulsions, the step of introducing therein a reagent, the constituting components of which are sludge layer mineral oil aluminum sulphonate, and sodium hydroxide.

2. In the process of separating the oil and water of emulsions, the step of introducing into the emulsions a chemical reagent containing sludge layer mineral oil sodium sulphonate and sodium aluminate, the step of maintaining the emulsion at a temperature of from 150° to 200° F. to initiate coalescence and the step of stratifying the oil and water components of the emulsion.

In witness whereof, we hereunto subscribe our names.

CHARLES FISCHER, JR.
W. T. REDDISH.